(12) United States Patent
Kurihara

(10) Patent No.: US 11,354,073 B2
(45) Date of Patent: Jun. 7, 2022

(54) INFORMATION PROCESSING APPARATUS, STORAGE MEDIUM, AND CONTROL METHOD

(71) Applicant: CANON KABUSHIKI KAISHA, Tokyo (JP)

(72) Inventor: Shukei Kurihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/849,189

(22) Filed: Apr. 15, 2020

(65) Prior Publication Data

US 2020/0341705 A1 Oct. 29, 2020

(30) Foreign Application Priority Data

Apr. 26, 2019 (JP) .............................. JP2019-086272
Feb. 6, 2020 (JP) .............................. JP2020-019176

(51) Int. Cl.
*G06F 3/12* (2006.01)
*H04W 8/00* (2009.01)
*H04L 41/0253* (2022.01)
*H04N 1/44* (2006.01)

(52) U.S. Cl.
CPC .......... *G06F 3/1238* (2013.01); *G06F 3/1203* (2013.01); *G06F 3/1224* (2013.01); *G06F 3/1292* (2013.01); *H04W 8/005* (2013.01); *H04L 41/0253* (2013.01); *H04N 1/44* (2013.01)

(58) Field of Classification Search
CPC .... G06F 3/1238; G06F 3/1292; G06F 3/1224; G06F 3/1203; G06F 3/1204; G06F 3/1226; G06F 3/1236; H04W 8/005; H04W 12/06; H04W 84/12; H04N 1/00217; H04N 1/00315; H04N 1/00392; H04N 1/00411; H04N 1/44; H04N 1/4413; H04L 41/0213; H04L 41/0253; H04L 41/16
USPC ........................................................ 358/1.15
See application file for complete search history.

(56) References Cited

U.S. PATENT DOCUMENTS

| 2005/0165834 | A1* | 7/2005 | Nadeau | H04L 41/0213 |
| 2006/0026301 | A1* | 2/2006 | Maeda | H04L 67/2823 709/246 |
| 2006/0242284 | A1 | 10/2006 | Savage | |
| 2006/0282527 | A1* | 12/2006 | Chiou | H04L 41/0253 709/224 |
| 2009/0113035 | A1* | 4/2009 | Ohashi | H04L 63/20 709/223 |

FOREIGN PATENT DOCUMENTS

| CN | 1384642 A | 12/2002 |
| CN | 101192984 A | 6/2008 |

(Continued)

*Primary Examiner* — Darryl V Dottin
(74) *Attorney, Agent, or Firm* — Canon U.S.A., Inc. IP Division

(57) ABSTRACT

To search for a device from an information processing apparatus in Simple Network Management Protocol version 3 (SNMPv3), it is necessary to set information such as authentication information. However, there is such an issue that, in a case where settings of such information are inadequate, if a desired multi-function printer (MFP) is a device with settings for responding only to SNMPv3, the desired MFP cannot be found even if a search is performed. Therefore, a user is notified that SNMPv3 settings are necessary.

18 Claims, 14 Drawing Sheets

(56) References Cited

FOREIGN PATENT DOCUMENTS

| | | | |
|---|---|---|---|
| CN | 104426912 | A | 3/2015 |
| CN | 107104809 | A | 8/2017 |
| JP | 2008-146410 | A | 6/2008 |
| WO | 0124445 | A2 | 4/2001 |

\* cited by examiner

FIG.10

SNMPv3 SETTINGS — 1001

☑ USE SNMPv3

| | |
|---|---|
| USER NAME: | user1 — 1002 |
| MIB ACCESS RIGHT: | READ ▽ — 1003 |
| SECURITY SETTINGS: | WITH AUTHENTICATION/ WITH ENCRYPTION ▽ — 1004 |
| AUTHENTICATION ALGORITHM: | ○ MD5   ● SHA1 — 1005 |
| AUTHENTICATION PASSWORD: | password_1 — 1006 |
| ENCRYPTION ALGORITHM: | ○ DES   ● AES — 1007 |
| ENCRYPTION PASSWORD: | password_2 — 1008 |

FIG.11

| SNMP SETTINGS | | 1101 |
|---|---|---|

SNMPv1 SETTINGS

USE SNMPv1 ⬤— 1102

COMMUNITY NAME: [public] — 1103

---

SNMPv3 SETTINGS

USE SNMPv3 ⬤— 1104

USER NAME: [user1] — 1105

MIB ACCESS RIGHT: [READ ▽] — 1106

SECURITY SETTINGS: [WITH AUTHENTICATION/ WITH ENCRYPTION ▽] — 1107

AUTHENTICATION ALGORITHM: ○ MD5  ◉ SHA1 — 1108

AUTHENTICATION PASSWORD: [password_1] — 1109

ENCRYPTION ALGORITHM: ○ DES  ◉ AES — 1110

ENCRYPTION PASSWORD: [password_2] — 1111

US 11,354,073 B2

INFORMATION PROCESSING APPARATUS, STORAGE MEDIUM, AND CONTROL METHOD

BACKGROUND

Field of the Disclosure

The present disclosure relates to a technology of searching for an external apparatus and displaying a search result.

Description of the Related Art

In recent years, high-performance mobile terminals called smartphones have been widespread, and an application has appeared which communicates with an image processing apparatus such as a multi-function printer (MFP) using a mobile terminal, so that a print instruction or a scan instruction can be issued from the mobile terminal (hereinafter referred to as the MFP application). Such an MFP application searches for an MFP on a network by wireless communication and determines an MFP to be used by a user based on a search result. Subsequently, the MFP application enables the user to select a file such as a Joint Photographic Experts Group (JPEG) image file or a Portable Document Format (PDF) file stored in a mobile terminal, and transmits the file and print settings designated by the user to the MFP.

Meanwhile, as a method of searching for an MFP on a network, there is a method of broadcasting a packet in a communication protocol called Simple Network Management Protocol (SNMP), and determining whether a responding MFP is an MFP supported by an MFP application based on information obtained from a management information base (MIB) transmitted from the responding MFP. Japanese Patent Application Laid-Open No. 2008-146410 discusses a method of searching for a print processing apparatus using both of SNMP version 1 (SNMPv1) and SNMP version 3 (SNMPv3).

In order for a mobile terminal to search for an MFP using SNMPv3, it is necessary to make settings of information such as authentication information on the mobile terminal. However, there is a case where a general user is unaware that such settings are necessary, or where such settings have been made but are incorrect. In this case, there is such an issue that, in a case an MFP desired by the user is an MFP with settings for responding only to SNMPv3, the desired MFP cannot be found even if a search is performed, because the settings are inadequate.

SUMMARY

According to embodiments of the present disclosure, a method of controlling an information processing apparatus capable of communicating with an external apparatus in Simple Network Management Protocol version 3 (SNMPv3) and capable of making a first setting about SNMPv3 includes providing a user with a notification indicating that the first setting is inadequate in a case where the first setting is inadequate.

Further features of the present disclosure will become apparent from the following description of exemplary embodiments with reference to the attached drawings.

BRIEF DESCRIPTION OF THE DRAWINGS

FIG. 10 illustrates an example of a setting screen for SNMPv3 settings to be displayed in the MFP.

FIG. 11 illustrates an example of an SNMP setting screen to be displayed by the MFP application.

DESCRIPTION OF THE EMBODIMENTS

Exemplary embodiments of the present disclosure will be described below with reference to the drawings. The following exemplary embodiments are not intended to be limited, and not all combinations of features described in the exemplary embodiments are deemed to be necessary.

The exemplary embodiments of the present disclosure will be described in detail below with reference to the drawings.

Figure 1:
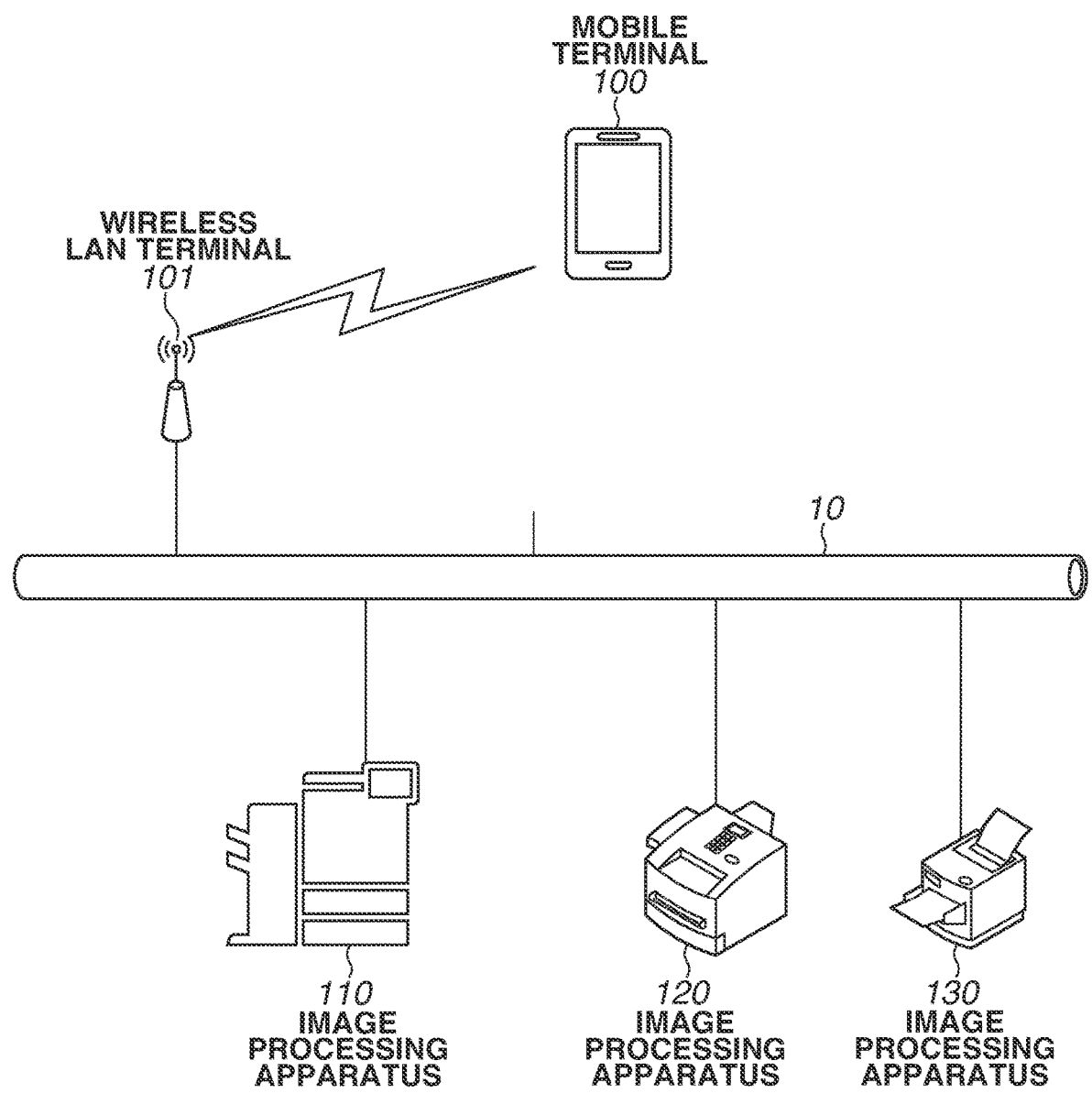
FIG. 1 is a diagram illustrating a configuration according to an exemplary embodiment.

FIG. 1 is a diagram illustrating a configuration of a data processing system, according to a first exemplary embodiment of the present disclosure. In FIG. 1, a mobile terminal 100 is used as an example of an information processing apparatus. The mobile terminal 100 is a computer to be used to provide an instruction for transmitting a print job to each of a multi-function printer (MFP) 110, a single-function printer (SFP) 120, and an SFP 130.

Each of the MFP 110, the SFP 120, and the SFP 130 is an example of an image processing apparatus. The MFP 110 has functions such as a copy function, a scanner function, and a facsimile transmission function, in addition to a printer function. A wireless local area network (LAN) terminal 101 is illustrated in FIG. 1. In the present exemplary embodiment, in each of the image processing apparatuses 110, 120, and 130, a communication protocol, specifically, Simple Network Management Protocol version 3 (SNMPv3), is set to be ON, and authentication and encryption of a security setting are enabled. A device in which SNMPv3 is set to be ON will be hereinafter referred to as the apparatus (device) with SNMPv3 settings.

A LAN 10 is a network to which the above-described apparatuses are connected, and the above-described apparatuses communicate with each other via the LAN 10. The wireless LAN terminal 101 is a base station of a wireless LAN and the base station has a general network/router function. The wireless LAN terminal 101 provides the wireless LAN in a place such as a house or office. The mobile terminal 100 can connect to the LAN 10 via the wireless LAN terminal 101 by enabling a wireless LAN function. When entering a wireless LAN area provided by the wireless LAN terminal 101, the mobile terminal 100 can automatically connect to the network of the LAN 10, using authentication information set beforehand.

Figure 2:
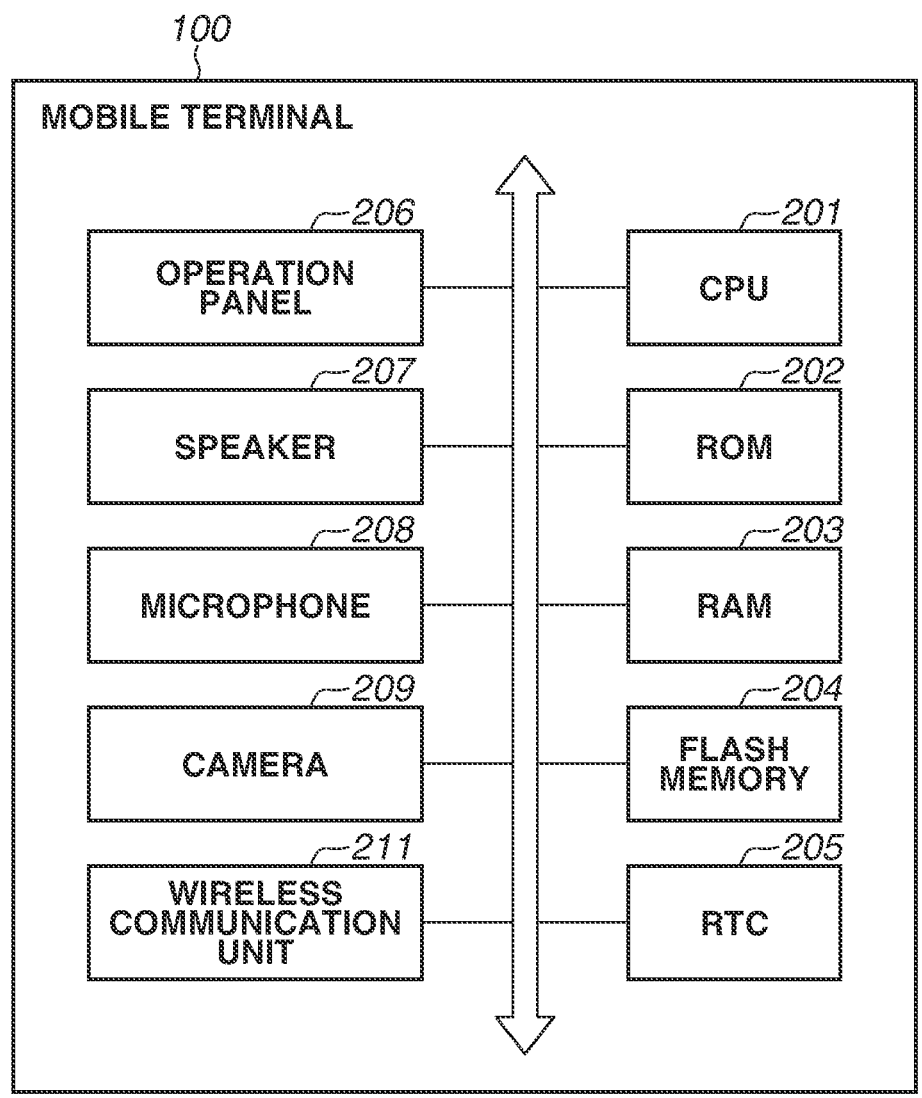
FIG. 2 is a diagram illustrating a hardware configuration of a mobile terminal.

Next, a hardware configuration of the mobile terminal 100 will be described with reference to FIG. 2. The mobile terminal 100 of the present exemplary embodiment is an apparatus such as a smartphone or tablet personal computer (PC), but may be other type of apparatus if this apparatus is an information processing apparatus that can execute wireless communication.

A central processing unit (CPU) 201 reads out a control program stored in a read only memory (ROM) 202, and executes various kinds of processing for controlling operation of the mobile terminal 100 based on the control program. The ROM 202 stores the control program. A random access memory (RAM) 203 is used as a temporary storage area functioning as a main memory, a work area, and the like of the CPU 201. A flash memory 204 stores various kinds of data such as images and electronic documents. The flash memory 204 also stores an operating system (OS) 350 and an MFP application 300 to be described below. A real time clock (RTC) 205 keeps the time.

In the case of the mobile terminal 100, one CPU 201 executes each step of processing in each flowchart to be described below, but another mode may be adopted. For example, a plurality of CPUs can also execute each step of the processing in each flowchart to be described below, in cooperation with one another.

An operation panel 206 has a touch panel function of enabling detection of a touch operation by a user, and displays various screens provided by the OS 350 or the MFP application 300. The user can input a desired operating instruction into the mobile terminal 100 by inputting a touch operation on the operation panel 206.

A speaker 207 and a microphone 208 are used when the user talks to someone by connecting to another mobile terminal or a fixed telephone. A camera 209 captures an image based on an image capturing instruction of the user. The image captured by the camera 209 is stored in a predetermined area of the flash memory 204.

A wireless communication unit 211 connects to, for example, a wireless communication LAN or a public line to execute wireless communication.

Figure 3:
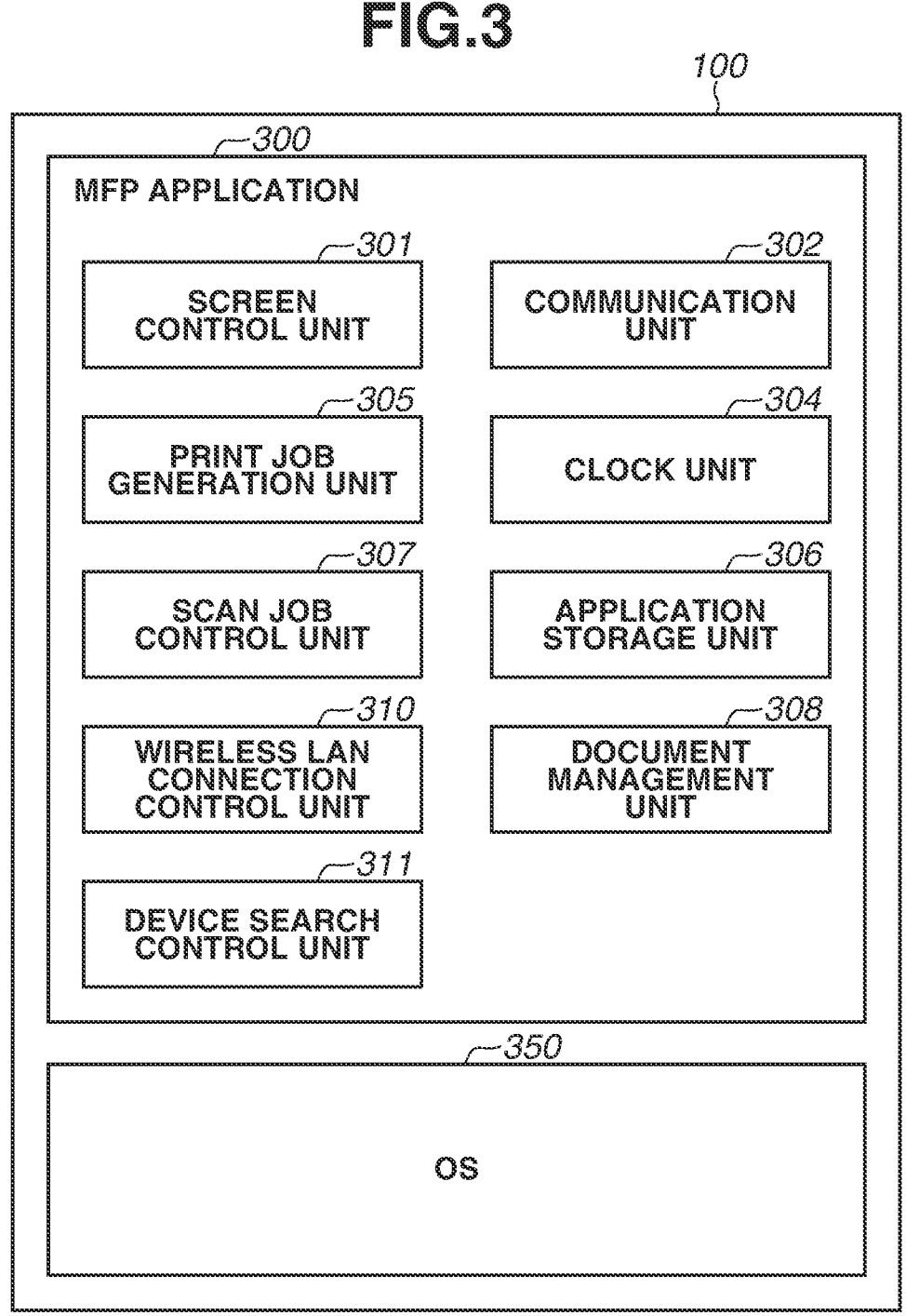
FIG. 3 is a diagram illustrating a configuration of software of the mobile terminal.

Next, a software configuration of the mobile terminal 100 will be described with reference to FIG. 3. FIG. 3 is a functional block diagram illustrating software that the CPU 201 implements by reading out the control program stored in the ROM 202 or the flash memory 204.

The OS 350 is a piece of software for controlling operation of the entire mobile terminal 100. Various applications, including the MFP application 300 to be described below, can be installed on the mobile terminal 100. The OS 350 exchanges information with these applications, and changes a screen displayed on the operation panel 206 based on an instruction received from each of the applications. The OS 350 includes a device driver group for controlling various pieces of hardware, and provides an application programing interface (API) for using various pieces of hardware for an application operating on an OS.

The MFP application 300 is an application installed on the mobile terminal 100. The MFP application 300 enables the user to perform operations such as a print operation and a scan operation for an MFP. Besides the MFP application 300, other various applications are installed on the mobile terminal 100, but the description thereof will be omitted.

A software configuration of the MFP application 300 will be described more in detail. A screen control unit 301 controls a screen displayed on the operation panel 206 via the OS 350. An MFP application screen is displayed on the operation panel 206 by the screen control unit 301. Further, the screen control unit 301 determines an operating instruction input by the user via the operation panel 206. A communication unit 302 controls wireless communication by the wireless communication unit 211 via the OS 350 to, for example, transmit and receive commands.

A print job generation unit 305 generates a print job. The print job generated by the print job generation unit 305 is transmitted to an MFP by the wireless communication unit 211, and the MFP executes printing based on the print job.

A wireless LAN connection control unit 310 controls connection to a wireless LAN, and instructs the OS 350 to execute the connection.

An application storage unit 306 temporarily holds various kinds of information.

A scan job control unit 307 provides a scan instruction to the MFP via the wireless communication unit 211, and controls scan data received from the MFP. In a case where the scan data is to be saved, the scan data is temporarily held in the application storage unit 306. A document management unit 308 manages the held scan data.

A device search control unit 311 provides a function of enabling the mobile terminal 100 to search for network devices managed in SNMP, and to search for an MFP to which the mobile terminal 100 can provide an instruction among these network devices, on the LAN 10 to which the mobile terminal 100 is connected. In the present exemplary embodiment, SNMPv1 and SNMPv3 are each used as a search protocol.

A clock unit 304 keeps the time via the RTC 205.

Figure 4:
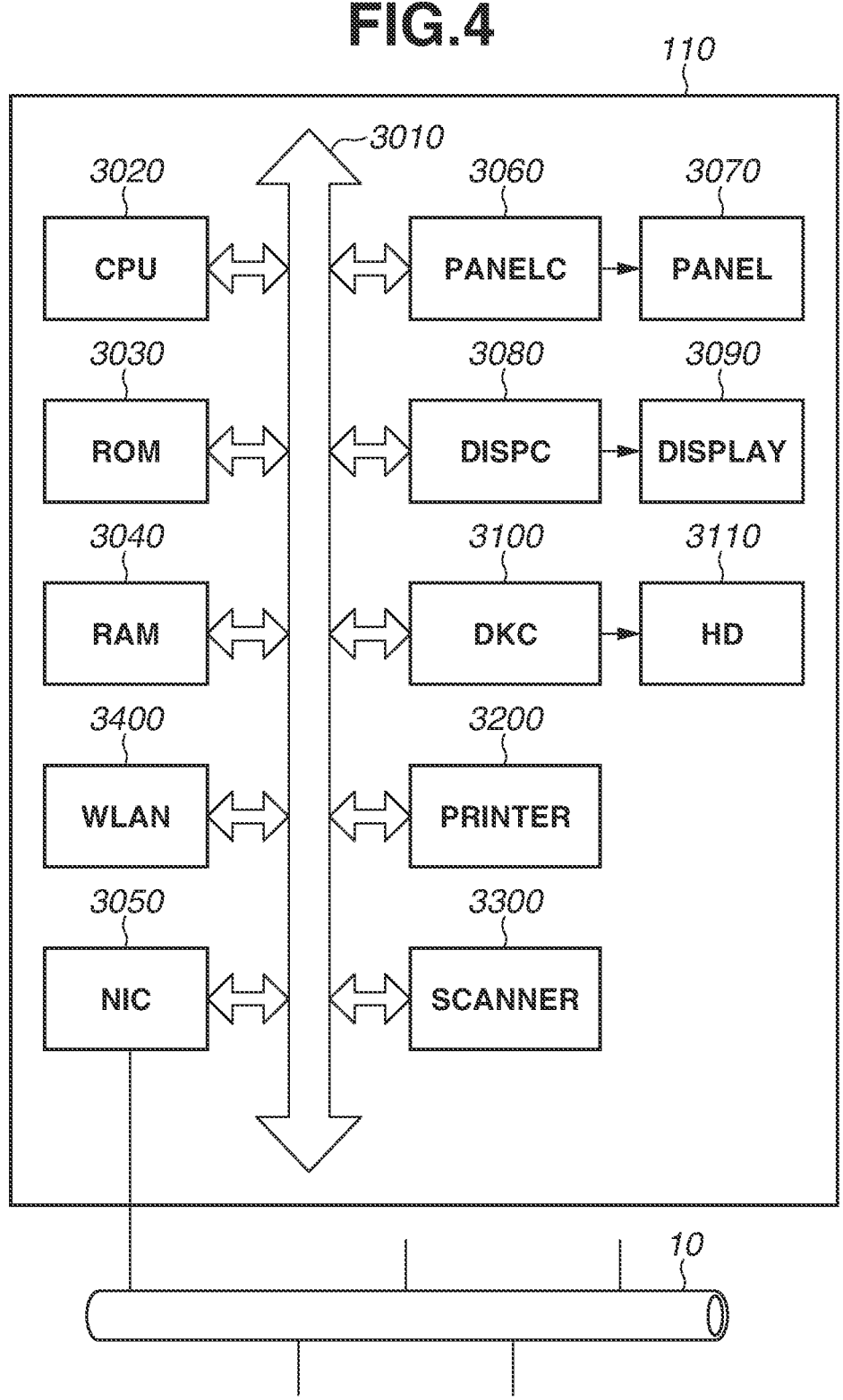
FIG. 4 is a diagram illustrating a hardware configuration of an image processing apparatus.

FIG. 4 illustrates an example of an inner configuration of the MFP 110. The SFP 120 and the SFP 130 of the present exemplary embodiment each also have a configuration similar to that of the MFP 110 except that these are of the single function type.

FIG. 4 illustrates an overall configuration of the MFP 110. The MFP 110 includes a CPU 3020 that executes software stored in a ROM 3030 or a large-scale storage 3110 such as a hard disk (HD). The CPU 3020 comprehensively controls devices connected to a system bus 3010.

A RAM 3040 serves as a main memory and a work area of the CPU 3020. A panel controller (PANELC) 3060 controls instruction inputs from various buttons or a touch panel (PANEL) 3070 provided in the MFP 110. A display controller (DISPC) 3080 controls display of a display module (DISPLAY) 3090 configured of, for example, a liquid crystal display. A disk controller (DKC) 3100 controls the large-scale storage device (HD) 3110.

A network interface card (NIC) 3050 exchanges data with another network device or an apparatus such as a file server via the LAN 10. A wireless LAN (WLAN) 3400 is a wireless communication module that connects to an access point or operates in an access point mode, so that the MFP 110 operates as an access point and can be directly connected to a mobile terminal by wireless communication. A printer 3200 is a print unit that performs printing on paper using an electrophotographic system. A printing system to be employed may not be the electrophotography system.

A scanner 3300 is an image reading unit that reads an image printed on paper. In many cases, an automatic document feeder (ADF) (not illustrated) is mounted on the scanner (image reading unit) 3300 as an option, so that a plurality of original documents can be automatically read. The large-scale storage device (HD) 3110 may be used as a temporary image storage location in some cases.

Figure 9:
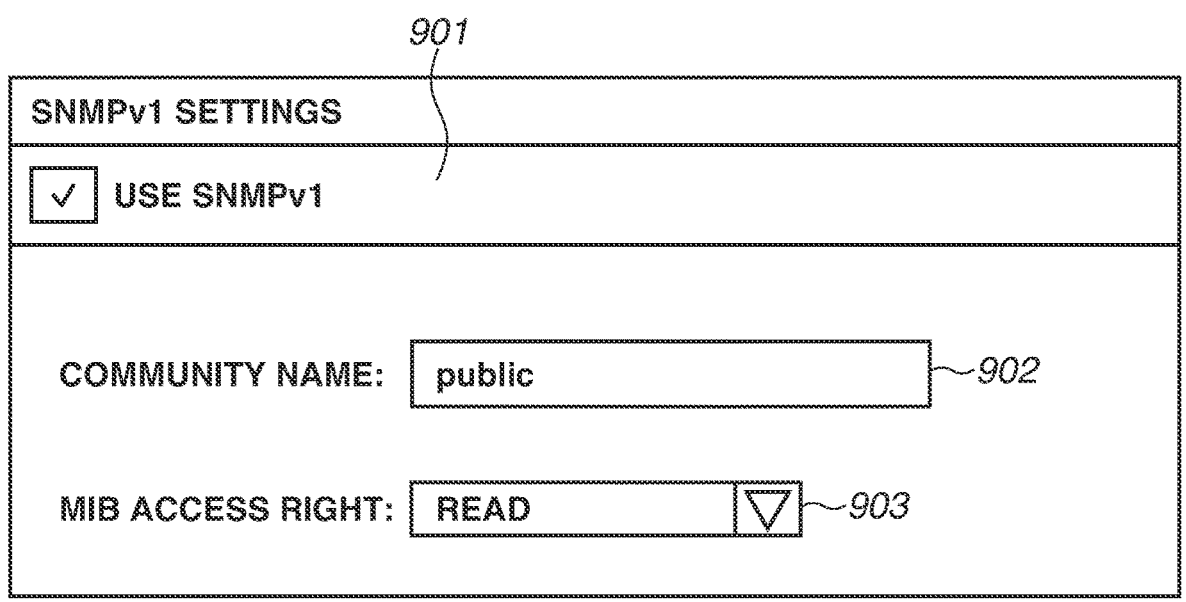
FIG. 9 illustrates an example of a setting screen for SNMPv1 settings to be displayed in an MFP.

FIG. 9 illustrates an operation screen for SNMPv1 setting information, and this screen is displayed on the display module 3090 included in the MFP 110. A check box 901 is provided to enable/disable response based on SNMPv1. An item 902 is provided to set a community name of SNMPv1, and "public" is set as a general default value. A pull-down menu 903 is provided to set a management information base (MIB) access right, and besides "read", "read/write" can be selected. In the present exemplary embodiment, an access requested by the mobile terminal 100 is acquisition of an MIB, and therefore, an access right of "read" is necessary. In the present exemplary embodiment, the image processing apparatuses 110, 120, and 130 are each set such that SNMPv1 is disabled.

FIG. 10 illustrates a setting operation screen for making the SNMPv3 settings, and this screen is displayed on the display module 3090 included in the MFP 110. A check box 1001 is provided to enable/disable response based on SNMPv3. An item 1002 is provided to set a user name of SNMPv3. There is no general default value, and thus it is necessary for the user to set some text string as the user name. A pull-down menu 1003 is provided to set an MIB access right and enables setting similar to that for the pull-down menu 903 described above. A pull-down menu 1004 is provided to make a security setting, and enables the user to select, in addition to "with authentication/with encryption", "with authentication/without encryption" and "without authentication/without encryption". In the present exemplary embodiment, "with authentication/with encryption" is set. In "with authentication", a user who attempts to acquire the MIB of a device in SNMPv3 is authenticated when the user makes this attempt. In "with encryption", a packet in SNMPv3 is encrypted. An item 1005 is provided to select an authentication algorithm in an authentication setting. An item 1006 is provided to set an authentication password. An item 1007 is provided to select an encryption algorithm in an encryption setting. An item 1008 is provided to set an encryption password. In the present exemplary embodiment, the image processing apparatuses 110, 120, and 130 are each set such that SNMPv3 is enabled.

FIG. 11 illustrates an SNMP setting screen in the MFP application 300. A button 1101 is provided to return to the previous setting screen. An item 1102 is provided to set whether to use SNMPv1 in searching for an MFP. An item 1103 is provided to set a community name when SNMPv1 is used, and needs to match with the corresponding setting on the MFP desired to be found in a search. As with the item 902 on the MFP side, "public" is set as a general default value. An item 1104 is provided to set whether to use SNMPv3 in searching for an MFP. An item 1105 is provided to set a user name of SNMPv3, and needs to match with the corresponding setting on the MFP desired to be found in the search. It is necessary for the user to set some text string, because there is no general default value. A pull-down menu 1106 is provided to set an MIB access right. A pull-down menu 1107 is provided to make a security setting, and needs to match with the corresponding setting on the MFP desired to be found in the search. Further, this pull-down menu enables the user to select, in addition to "with authentication/with encryption", "with authentication/without encryption" and "without authentication/without encryption". An item 1108 is provided to select an algorithm to be used for authentication, and needs to match with the corresponding setting on the MFP desired to be found in the search. An item 1109 is provided to set a password to be used for authentication, and needs to match with the corresponding setting on the MFP desired to be found in the search. An item 1110 is provided to set an algorithm to be used for encryption, and needs to match with the corresponding setting on the MFP desired to be found in the search. An item 1111 is provided to set a password to be used for encryption, and needs to match with the corresponding setting on the MFP desired to be found in the search.

Next, an MFP search screen of the mobile terminal 100 will be described with reference to FIGS. 12A, 12B, 12C, and 12D. Here, "use" of SNMPv1 and SNMPv3 in FIG. 11 is selected.

Figure 12A:
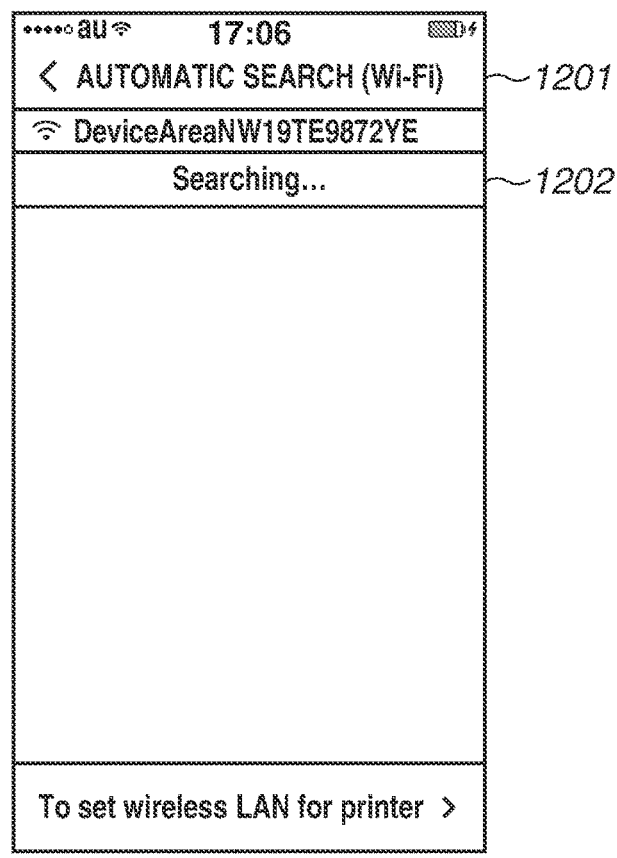
FIGS. 12A, 12B, 12C, and 12D each illustrate an example of a device search screen to be displayed by the MFP application.

When a search screen in each of FIGS. 12A, 12B, 12C, and 12D is displayed, SNMPv1 search processing and SNMPv3 search processing asynchronously start. A button 1201 in FIG. 12A is provided to return to the previous screen. An area 1202 displays a state where no MFP is found immediately after start of the search processing. As soon as a device is found, a search result is displayed in list form in which found devices are displayed in order from the top.

Figure 12B:
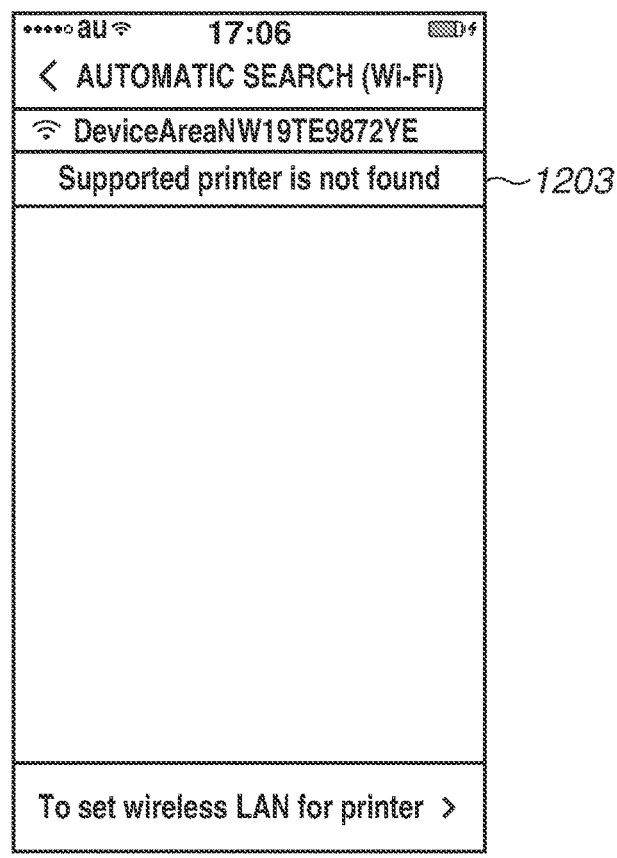
Figure 12C:
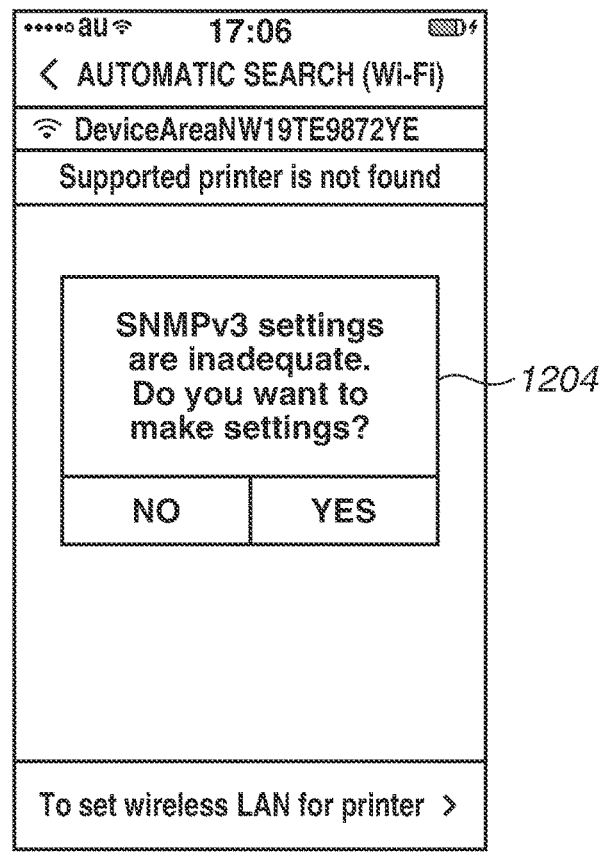
Figure 12D:
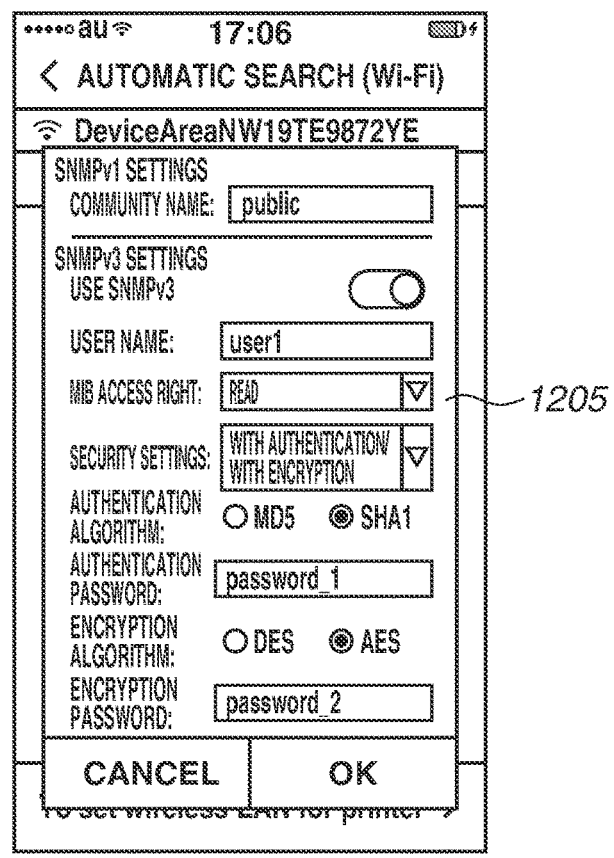

In a case where no MFP is found as a result of the search, the screen in FIG. 12B is displayed to notify the user that no MFP is found. In a case where no MFP supported by the MFP application 300 is found as a result of the search but there is a candidate for an MFP with SNMPv3 settings that may be supported by the MFP application 300, the screen in FIG. 12C is displayed to notify the user of this state (finding no MFP although there is a candidate for an MFP with SNMPv3 settings that may be supported by the MFP application 300 means that the SNMPv3 settings are inadequate). Here, the MFP supported by the MFP application 300 is an MFP of a model corresponding to the MFP application 300, and a model to which an operation instruction can be issued by the MFP application 300. A candidate MFP that may be supported by the MFP application 300 can be determined from an engine identification (ID) acquired from an MFP in a search based on SNMPv3. This will be described in detail below. In FIG. 12C, a window 1204 is displayed to ask the user whether to make the SNMPv3 settings. When "YES" is selected in the window 1204, the screen in FIG. 12D appears. A window 1205 is a setting input window for SNMPv3, and when OK is pressed after setting values are input, a re-search is executed.

Figure 5:
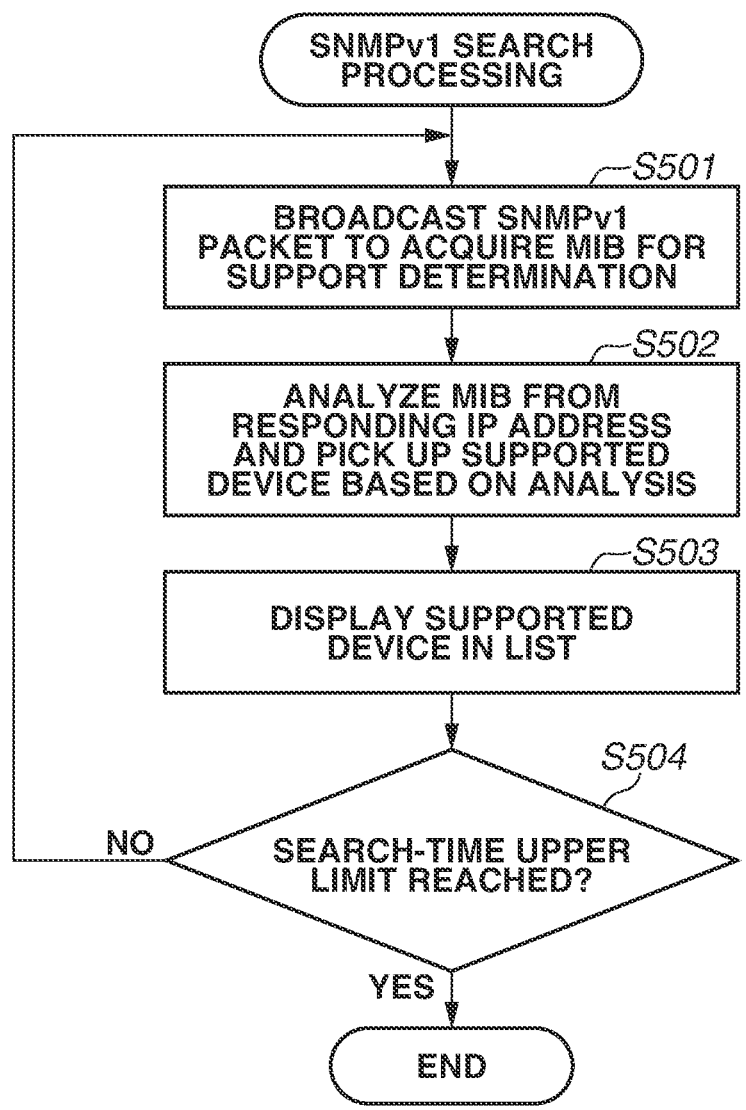
FIG. 5 is a flowchart illustrating Simple Network Management Protocol version 1 (SNMPv1) search processing to be performed by a multi-function printer (MFP) application, according to a first exemplary embodiment.
Figure 6:
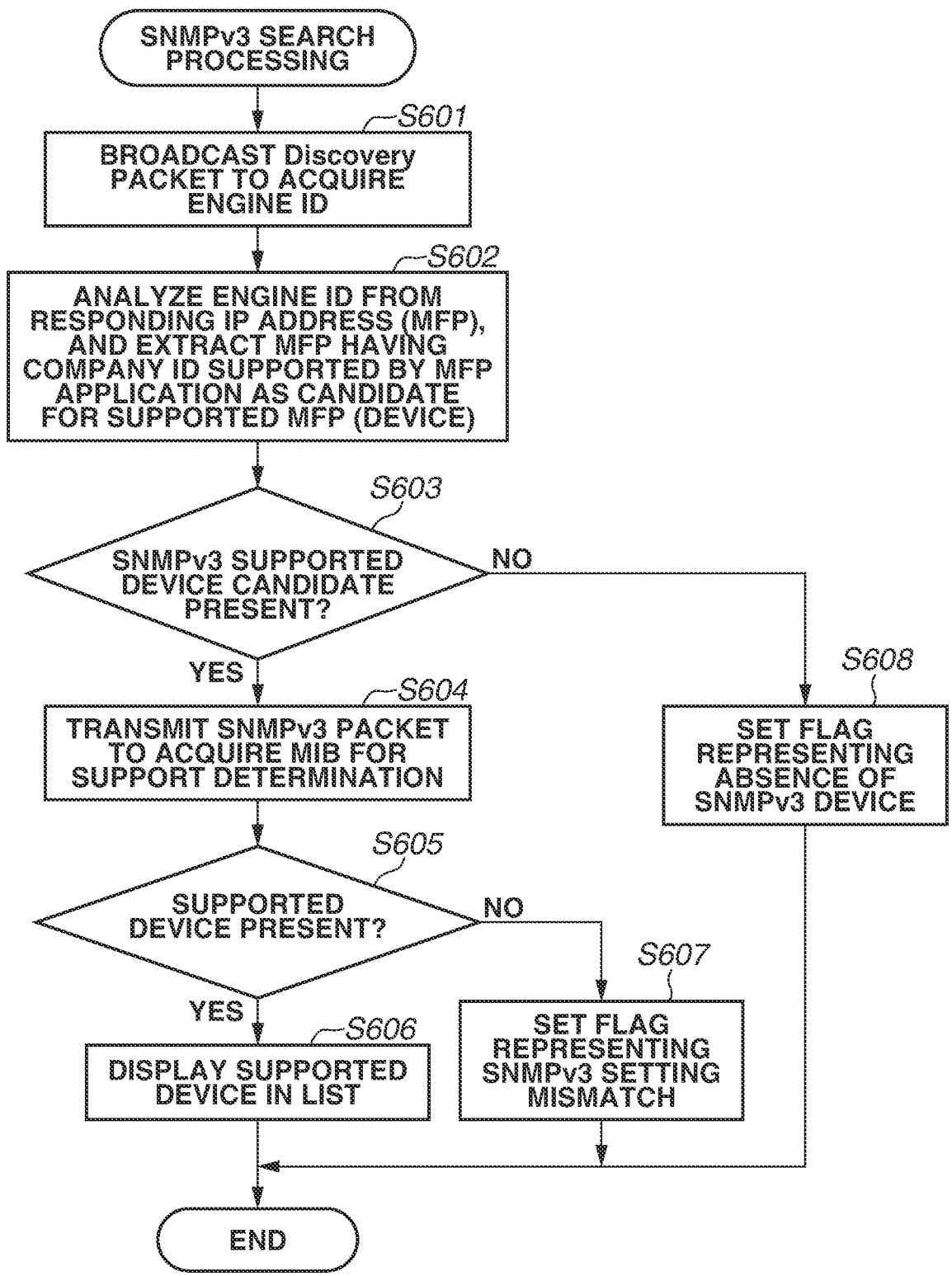
FIG. 6 is a flowchart illustrating SNMP version 3 (SNMPv3) search processing to be performed by the MFP application, according to the first exemplary embodiment.
Figure 7:
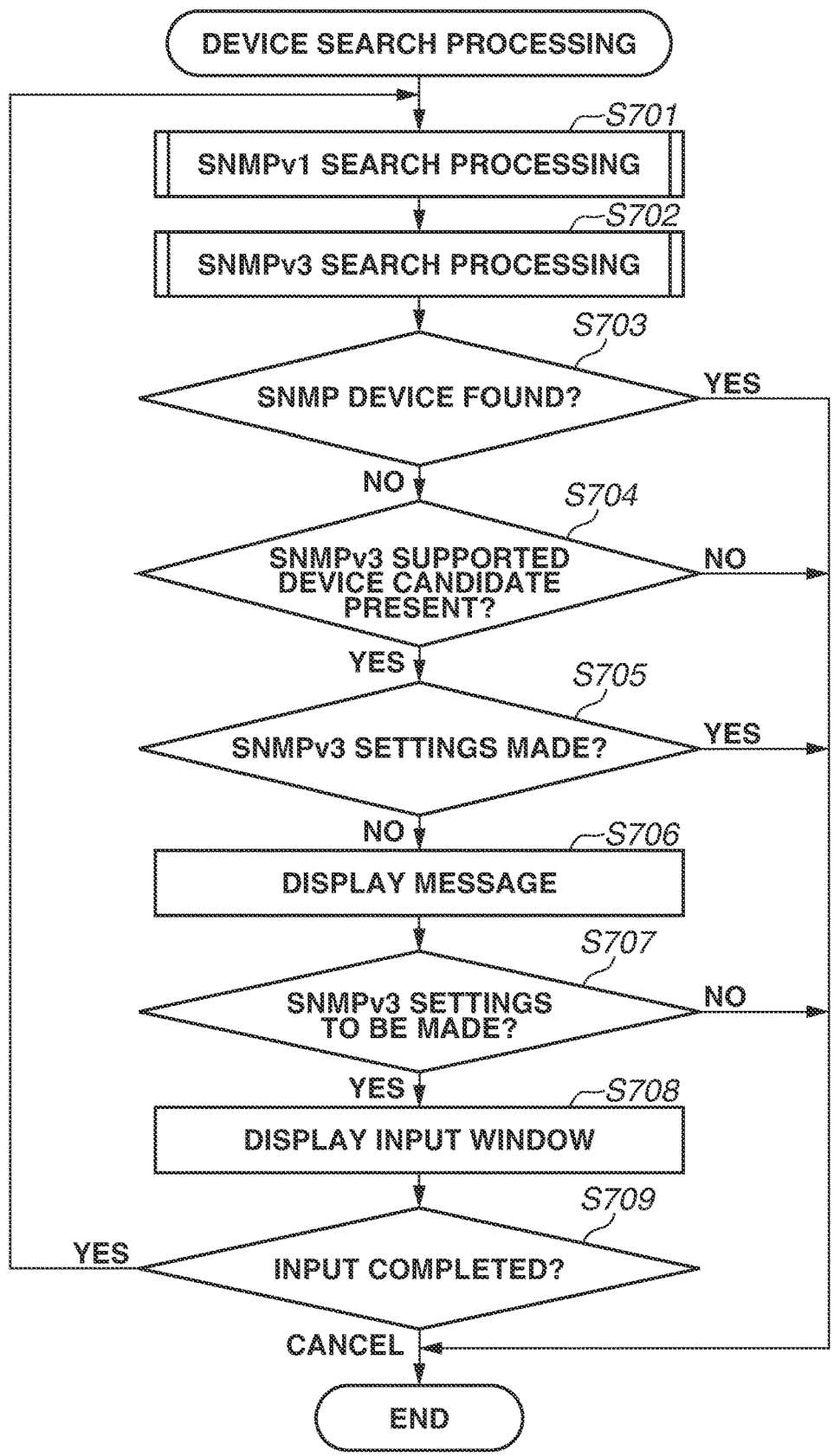
FIG. 7 is a flowchart illustrating device search processing to be performed by the MFP application, according to the first exemplary embodiment.

FIGS. 5, 6, and 7 each illustrate a flowchart concerning a method of controlling the MFP search screen to be executed by the MFP application 300.

The SNMPv1 search processing will be described with reference to FIG. 5. In step S501, the MFP application 300 broadcasts a packet in SNMPv1 form to acquire an MIB for determining a supported MFP, on the LAN 10. Examples of the MIB for determining the supported MFP include a product model name.

In step S502, the MFP application 300 analyzes an MIB from an MFP indicated by an IP address responding to the broadcast, and picks up a supported MFP based on the analysis. A product model name acquired from the MIB of the MFP responding to the broadcast and a support list based on product model names that is held beforehand by the MFP application 300 are checked against each other to determine the supported MFP.

In step S503, the MFP application 300 displays the MFP picked up in step S502 in list form, in the area 1202. In step S504, the MFP application 300 determines whether an upper limit of a search time from the start of the search processing is reached. If the upper limit of the search time is reached (YES in step S504), the SNMPv1 search processing ends. If the upper limit of the search time is not reached (NO in step S504), the processing returns to step S501. In step S502 in the second or subsequent round, a response from an IP address that is the same as that in the first round is excluded from pickup targets. It is desirable to have a waiting time of about a few seconds when the processing returns to step S501, because frequent occurrence of the broadcast in step S501 places a load on the network. The upper limit of the search time is also set to a few tens of seconds because of a load on the network. In the SNMPv1 search processing, settings for security such as authentication and a password are not necessary for the acquisition of the MIB on the mobile terminal 100.

The SNMPv3 search processing to be executed in parallel with the start of the SNMPv1 search processing will be described with reference to FIG. 6. In step S601, the MFP application 300 broadcasts a packet in SNMPv3 form to acquire an engine ID, on the LAN 10. The packet in SNMPv3 form to acquire an engine ID is called a Discovery packet (or a Discovery message), and in the SNMPv3 specifications, a user name and a security setting including authentication and a password are not necessary. Therefore, the speed of a response from an image processing apparatus to the packet in SNMPv3 form to acquire an engine ID is fast.

In step S602, the MFP application 300 analyzes an engine ID from a responding IP address (MFP), and extracts an MFP having a company ID supported by the MFP application 300 as a candidate for a supported MFP (device), based on the analysis. The leading four octets of the engine ID correspond to the company ID.

In step S603, the MFP application 300 determines whether a candidate for a supported device of SNMPv3 extracted in step S602 is present. If the candidate is present (YES in step S603), the processing proceeds to step S604. If the candidate is not present (NO in step S603), the processing proceeds to step S608.

In a case where the candidate for a supported MFP is present in step S603, the MFP application 300 cannot determine whether this candidate is a supported MFP, because information representing an MIB is not acquired in this step. Therefore, in step S604, the MFP application 300 transmits a packet in SNMPv3 form to acquire an MIB to the IP address of the MFP picked up as the candidate in step S602, in order to determine whether this MFP is a supported MFP. In order to acquire this MIB, a user name and a security setting including authentication and a password are necessary. The MIB to be acquired is a product model name as with step S501 in the SNMPv1 search processing.

In step S605, the MFP application 300 acquires the MIB and determines whether a supported device of the MFP application 300 is present based on the acquired MIB. In a case where there is a response within time out of about a few seconds, the MFP application 300 determines that the supported device is present. If the supported device is present (YES in step S605), the processing proceeds to step S606. If the supported device is not present (NO step S605), the processing proceeds to step S607. In step S606, the MFP application 300 displays a device determined to be the supported device in list form.

In step S607, the MFP application 300 sets a flag that represents information indicating that there is a mismatch in terms of SNMPv3 setting information. A device in which this flag is set is hereinafter referred to as a supported device candidate with SNMPv3 settings. This device is the device with SNMPv3 settings that can communicate with the mobile terminal 100, but is not recognized as a supported device because settings such as security for SNMPv3 on the mobile terminal 100 are inadequate. Examples of the case where the settings are inadequate include a case where settings are not input and thus setting information is insufficient for a reason such as blanks, and a case where settings are input but the setting information of the mobile terminal 100 and that of the device are different.

In step S608, the MFP application 300 sets a flag that represents information indicating absence of an SNMPv3 device.

FIG. 7 is a flowchart illustrating a flow of the overall search processing. As an example, a case will be described where a notification is issued when settings including the security for SNMPv3 are not made although "use" of SNMPv3 is selected by the user on the mobile terminal 100. This flowchart starts from a state where the user provides an instruction for a device search on the mobile terminal 100.

When the search instruction is provided, in step S701, the SNMPv1 search processing illustrated in FIG. 5 is executed. In step S702, the SNMPv3 search processing illustrated in FIG. 6 is executed. Step S701 and step S702 are executed in parallel.

In step S703, whether a supported SNMP device is found in each of step S701 and S702 is determined. If the supported SNMP device is found (YES in step S703), the processing ends. If the supported SNMP device is not found (NO in step S703), the processing proceeds to step S704.

In step S704, whether a supported device candidate with SNMPv3 settings is present is determined. Specifically, whether the flag representing an SNMPv3 setting information mismatch set in the SNMPv3 search processing in step S702 is present is determined. If the flag representing an SNMPv3 settings information mismatch is present (YES in step S704), the processing proceeds to step S705. If the flag representing an SNMPv3 settings information mismatch is not present (NO in step S704), the processing ends.

In step S705, whether the SNMPv3 settings illustrated in FIG. 11 are made is determined. This determination is implemented by, for example, determining whether the items such as the item 1002 for setting a user name of SNMPv3 remain blank. If the settings are made (YES in step S705), the processing ends. If the settings are not made (NO in step S705), the processing proceeds to step S706.

In step S706, a warning message like the message illustrated in FIG. 12C is displayed to indicate that the SNMPv3 settings are not made, and a button asking whether to make the settings is also displayed.

In step S707, whether the button for making the settings is pressed by the user (the SNMPv3 settings are to be made) is determined. If the button for making the settings is pressed (YES in step S707), the processing proceeds to step S708. If the button is not pressed (NO in step S707), the processing ends.

In step S708, the setting input window (FIG. 12D) is displayed.

In step S709, whether input in the setting input window displayed in step S708 is completed is determined. If an OK button is pressed, i.e., if the input is completed (YES in step S709), the processing returns to step S701, so that a re-search is performed. If a cancel operation by the user is detected, i.e., if the input is not completed (NO in step S709), the processing ends. The above-described processing makes it possible to notify a user, who is unaware of the settings of the items such as security in searching for a device based on SNMPv3, that the settings are necessary. Because the notification is provided only when a supported device candidate with SNMPv3 settings is present, providing an unnecessary notification can be prevented. If the SNMPv3 settings for items such as security are made on the mobile terminal 100 in step S705, the processing ends. However, if there is no response from a supported device (an MIB cannot be acquired) although the settings are made, there is a possibility that the SNMPv3 settings for items such as security are incorrect. Therefore, in a case where the SNMPv3 settings are made in step S705, a warning may be displayed to indicate that the settings input in the screen in FIG. 11 may be incorrect.

The timing of displaying a warning message is not limited to the above-described timing. For example, in a case where the user has provided an instruction for starting the device search processing in a state where the settings for items such as security in the SNMPv3 setting screen illustrated in FIG. 11 are not made (blank), a warning message may be displayed at the timing when the user has provided a search instruction. Further, although the flow in step S701 and the flow in step S702 run in parallel, whether the SNMPv3 settings for items such as security are made may be confirmed at the timing when a supported device is not found upon completion of the SNMPv1 search in step S701, and a warning message may be displayed if the settings are not made.

In the configuration described in the first exemplary embodiment, for example, a screen for promoting the SNMPv3 settings can also be displayed, even in a case where a device with SNMPv1 settings can be searched for.

Even if a device with SNMPv1 settings is found, a desired printer is not found for a user who wants to search for a device with SNMPv3 settings, and thus a re-search is performed. However, a device with SNMPv3 settings cannot be found no matter how many times a re-search is performed, because the SNMPv3 settings for items such as security have not been made.

Therefore, in a second exemplary embodiment, in a case where an instruction for a re-search is provided even if a device with SNMPv1 settings is found, it is determined that a device with SNMPv3 settings is desired, and the user is notified that the SNMPv3 settings are necessary.

Figure 13A:
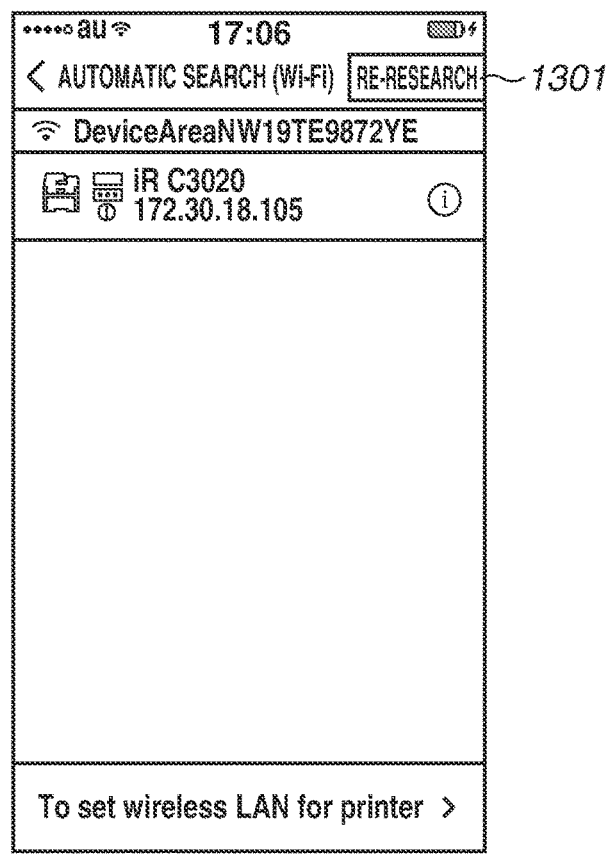
FIGS. 13A and 13B each illustrate an example of a device search screen to be displayed by the MFP application, according to the second exemplary embodiment.
Figure 13B:
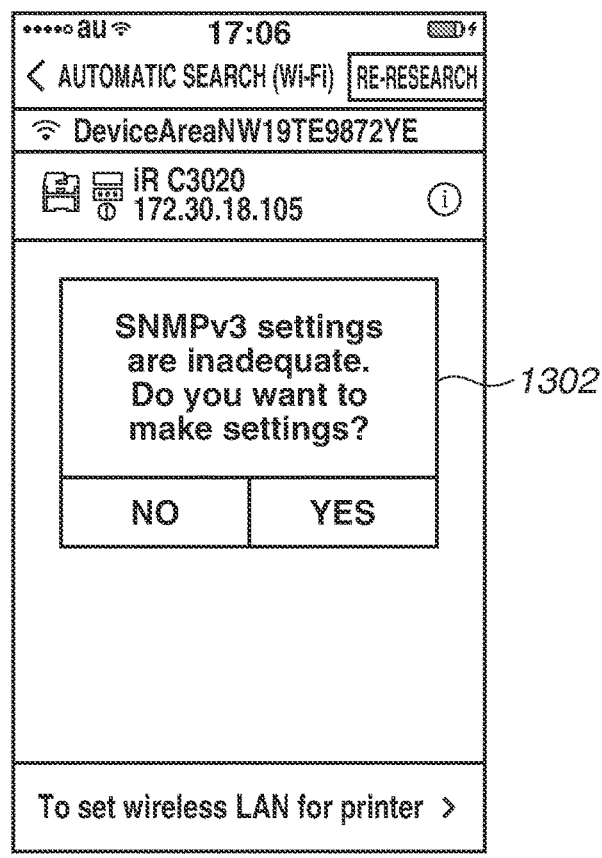

FIGS. 13A and 13B each illustrate a search screen of the second exemplary embodiment. FIG. 13A is a screen to be displayed when a search is over and only a device with SNMPv1 settings is searched for. A re-search button 1301 for starting a re-research is provided to issue an instruction for executing a device search again. In a case where an SNMPv3 candidate device is present when the re-search button 1301 is pressed, the screen in FIG. 13B is displayed to notify the user that the SNMPv3 settings are necessary.

Figure 8:
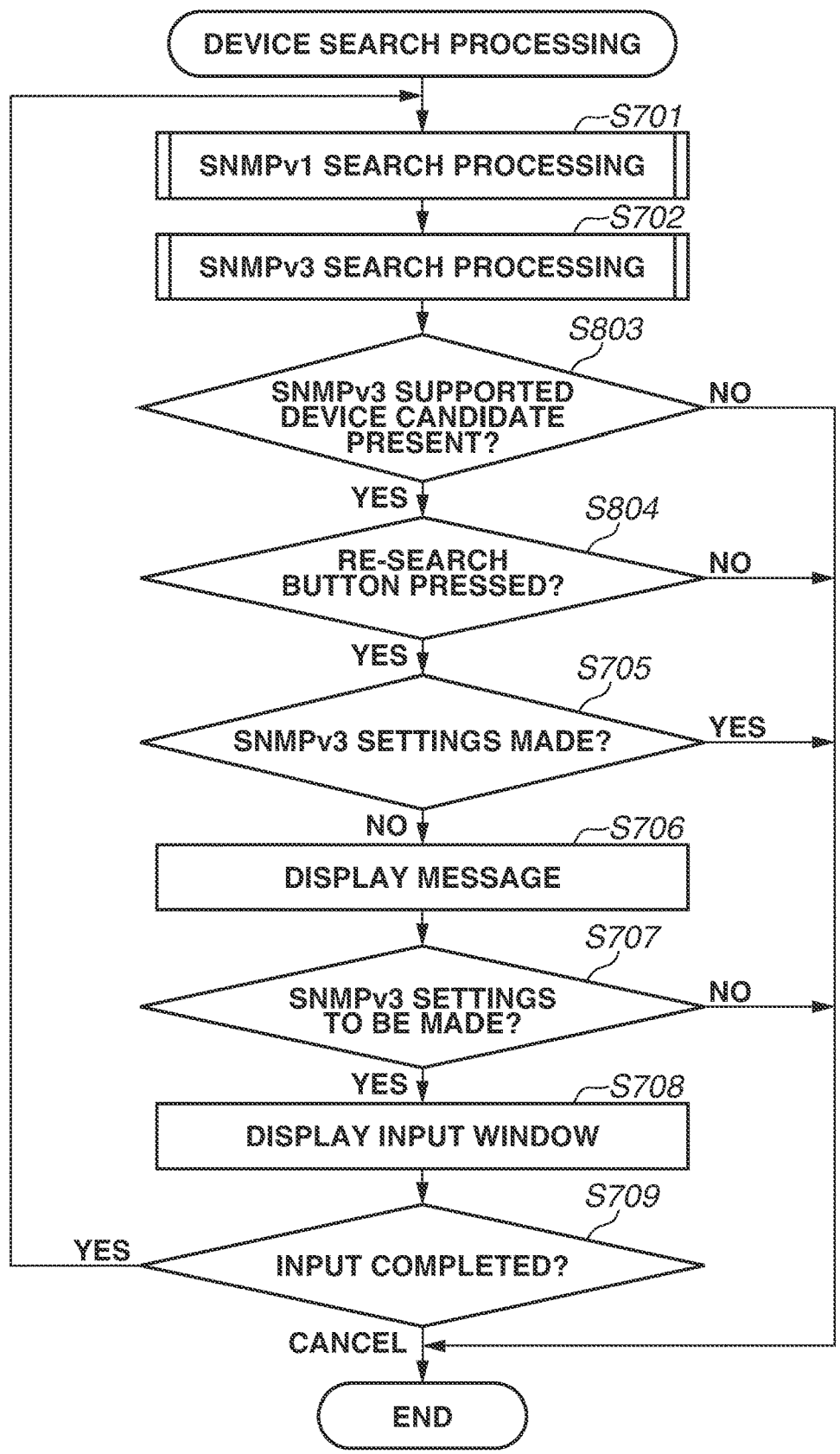
FIG. 8 is a flowchart illustrating device search processing to be performed by the MFP application, according to a second exemplary embodiment.

A basic configuration of the second exemplary embodiment is similar to that of the first exemplary embodiment. Therefore, only a flowchart in FIG. 8 illustrating a search processing flow including a point different from the first exemplary embodiment will be described. The basic configuration of the flowchart in FIG. 8 is similar to that of the flowchart in FIG. 7.

In the second exemplary embodiment, at the timing in step S803, whether a supported device candidate with SNMPv3 settings is present is determined. Specifically, whether the flag representing an SNMPv3 setting information mismatch set in the SNMPv3 search processing in step S702 is present is determined. If the candidate is present (YES in step S803), the processing proceeds to step S804. If the candidate is not present (NO in step S803), the processing ends.

In step S804, whether the re-search button 1301 is pressed in the displayed screen in FIG. 13A is determined. If the press of the re-search button 1301 is detected (YES in step S804), the processing proceeds to step S705. If the press of the re-search button 1301 is not detected (NO in step S804), the processing ends. As with the first exemplary embodiment, a warning message may be displayed to indicate that the settings may be incorrect, in a case where the SNMPv3 settings are made in step S705.

The above-described processing makes it possible to notify a user that the SNMPv3 settings are necessary in a re-search, if a desired device is a device with SNMPv3 settings and the SNMPv3 settings for items such as security are inadequate, even if a device with SNMPv1 settings is found. Further, here, a warning message is displayed when the re-search button is pressed by the user, but this is not limitative. In a case where a supported device candidate with SNMPv3 settings is present even if a device with SNMPv1 settings can be searched for (a supported device is present, but no result is displayed in a search result list because an MIB is not acquired), a warning message may be displayed to indicate that the SNMPv3 security settings in the screen in FIG. 11 are not made, or the settings are incorrect.

Other Exemplary Embodiments

In a case where "use" of SNMPv3 for a search is selected on the mobile terminal 100, but the SNMPv3 settings for items such as security are not made, a warning may be displayed when the user makes the settings on the SNMP setting screen in FIG. 11 to enable the user to notice such a state. For example, a configuration is conceivable in which a warning is displayed when the user closes the setting screen or makes screen transition without making settings for items such as a user name, after the user has selected "use" in the item 1104 for setting whether to use SNMPv3.

In the first and second exemplary embodiments, the image processing apparatus (MFP) is used as a communication partner of the information processing apparatus, but this is not limitative. The communication partner may be any type of apparatus if the apparatus is an external apparatus that can communicate with the information processing apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-086272, filed Apr. 26, 2019, and No. 2020-019176, filed Feb. 6, 2020, which are hereby incorporated by reference herein in their entirety.

What is claimed is:

1. A method of controlling an information processing apparatus capable of communicating with an external apparatus in Simple Network Management Protocol version 3 (SNMPv3) and executing an application capable of instructing an external apparatus to perform printing, the method comprising:
acquiring an engine identification from one or more external apparatuses by broadcasting a request for acquiring the engine identification;
transmitting, based on the acquired engine identification, a request for acquiring management information base (MIB) information to an external apparatus configured to transmit an engine identification including predetermined information, and acquiring the MIB information; and
displaying an external apparatus supported by the application as a search result based on the acquired MIB information,
wherein an external apparatus not supported by the application is not displayed as the search result based on the acquired MIB information.

2. The method according to claim 1,
wherein the information processing apparatus is capable of making a first setting about SNMPv3 and at least one of the external apparatuses is capable of making a second setting about SNMPv3,
the method further comprising:
broadcasting a packet for requesting the engine identification that is receivable irrespective of a content of the first setting, in SNMPv3;
performing first determination as to whether an external apparatus responding to the broadcasting is a candidate for an external apparatus supported by the application, based on the engine identification received from the external apparatus responding to the broadcasting; and
transmitting a packet for requesting MIB information that is receivable in a case where the content of the first setting satisfies a predetermined condition based on the second setting, in SNMPv3, to the external apparatus determined to be the candidate in the first determination, and
wherein a notification is provided in a case where the MIB information is not received after the transmitting.

3. The method according to claim 2, wherein the first setting and the second setting include at least one of a setting of a user name, a setting of an access right for the MIB information, an authentication setting, and an encryption setting.

4. The method according to claim 3, wherein the authentication setting includes at least one of an authentication algorithm and an authentication password and is a setting of authenticating a user who receives the MIB information, and the encryption setting includes at least one of an encryption algorithm and an encryption password and is a setting of encrypting the packet for receiving the MIB information.

5. The method according to claim 2, wherein the predetermined condition includes a match between the external apparatus and the information processing apparatus at least in terms of authentication algorithm and authentication password or in terms of encryption algorithm and encryption password.

6. The method according to claim 2, further comprising:
performing second determination as to whether the external apparatus determined to be the candidate is the external apparatus supported by the application, based on the MIB information.

7. The method according to claim 1, wherein in a case where information indicating a predetermined product model name is included in the acquired MIB information, an external apparatus corresponding to the MIB information is determined to be the external apparatus supported by the application and displayed as a search result, and in a case where information indicating a predetermined product model name is not included in the acquired MIB information, an external apparatus corresponding to the MIB information is determined to be not the external apparatus supported by the application and not displayed as a search result.

8. The method according to claim 1, wherein the predetermined information is a predetermined company ID.

9. The method according to claim 2,
wherein a packet for receiving third information that is receivable irrespective of a setting is broadcasted in SNMPv1 in the broadcasting,
the method further comprising:
performing third determination as to whether an external apparatus responding to the broadcasting in SNMPv1 is an external apparatus supported by the application, based on the third information, and
wherein the notification is provided in response to receipt of a predetermined instruction from the user, even in a case where the external apparatus responding to the broadcasting in SNMPv1 is determined to be an external apparatus supported by the application in the third determination.

10. A non-transitory computer-readable storage medium storing a program executed by a computer of an information processing apparatus capable of communicating with an external apparatus in SNMPv3, the program being for instructing an external apparatus to perform printing, wherein the program causes the information processing apparatus to perform:
acquiring an engine identification from one or more external apparatuses by broadcasting a request for acquiring the engine identification;
transmitting, based on the acquired engine identification, a request for acquiring management information base (MIB) information to an external apparatus configured to transmit an engine identification including predetermined information, and acquiring the MIB information; and displaying an external apparatus supported by the application as a search result based on the acquired MIB information, wherein an external apparatus not supported by the application is not displayed as the search result based on the acquired MIB information.

11. The method according to claim 1, wherein the request for acquiring the MIB information is transmitted to an external apparatus corresponding to an engine identification including a predetermined company ID based on the acquired engine identification, and the request for acquiring the MIB information is not transmitted to an external apparatus corresponding to an engine identification not including the predetermined company ID based on the acquired engine identification.

12. The method according to claim 1, wherein an external apparatus of a model supported by the application that is operated in the information processing apparatus is displayed as the search result based on the acquired MIB information.

13. The method according to claim 1, wherein the information processing apparatus is a mobile terminal, an external apparatus is an image processing apparatus including a print function, and the application is an application for giving an image processing instruction from the mobile terminal to the image processing apparatus.

14. A method of controlling an information processing apparatus capable of communicating with an external apparatus in Simple Network Management Protocol version 3 (SNMPv3), the method comprising:

broadcasting a packet for requesting the engine identification;

performing first determination as to whether an external apparatus responding to the broadcasting is a candidate for an external apparatus supported by the application, based on the engine identification received from the external apparatus responding to the broadcasting;

transmitting a packet for requesting MIB information to the external apparatus determined to be the candidate in the first determination; and displaying a notification in a case where the MIB information is not received after the transmitting and not displaying the notification in a case where it is determined in the first determination that there is no external apparatus supported by the application.

15. The method according to claim 14, wherein the notification is a notification for notifying that a setting SNMPv3 is inadequate.

16. The method according to claim 14, wherein it is determined in the first determination that the external apparatus corresponding to the engine identification including the predetermined information is the candidate for the external apparatus supported by the application.

17. The method according to claim 14, wherein in a case where information indicating a predetermined product model name is included in the acquired MIB information, an external apparatus corresponding to the MIB information is determined to be the external apparatus supported by the application and displayed as a search result, and in a case where information indicating a predetermined product model name is not included in the acquired MIB information, an external apparatus corresponding to the MIB information is determined to be not the external apparatus supported by the application and not displayed as a search result.

18. The method according to claim 14, wherein the information processing apparatus is a mobile terminal, an external apparatus is an image processing apparatus including a print function, and the application is an application for giving an image processing instruction from the mobile terminal to the image processing apparatus.

* * * * *